Patented Sept. 11, 1928.

1,683,862

UNITED STATES PATENT OFFICE.

CHARLES H. CAMPBELL, OF PITTSBURGH, PENNSYLVANIA, ASSIGNOR TO AMERICAN GLUE COMPANY, OF BOSTON, MASSACHUSETTS, A CORPORATION OF MASSACHUSETTS.

RUBBER COMPOSITION.

No Drawing. Application filed October 22, 1926. Serial No. 143,517.

The invention relates to an improvement in rubber compositions and by "rubber" is meant either natural rubber or reclaimed rubber or a combination of both and by "reclaimed rubber" is meant the rubber obtained by the devulcanizing of vulcanized rubber or rubber compositions.

The present application is in part a continuation of my prior application Serial No. 746,883, filed October 30, 1924.

Among the objects of the invention is to provide in a rubber composition or mix a reinforcing agent possessing no properties harmful to rubber over a long period of time. Especially is it my object to provide a reinforcing agent capable of making the rubber soft, tacky and dead in character before vulcanizing though resilient, elastic and tough with an extremely fine grain when vulcanized.

I have found that the objects of my invention are attained if the rubber (before the usual process of milling or refining in the case of reclaims) prior to vulcanizing has mixed or compounded with it by ordinary processes certain cleavage products obtained by the hydrolytic decomposition of collagen.

The derivatives or cleavage products employed as a reinforcing agent in accordance with my invention are those obtained by the hydrolytic decomposition of collagen to the point of obtaining soluble and diffusible cleavage products but preferably short of such hydrolytic decomposition as will form amino-acids, though some may be present, and preferably also those soluble and diffusible cleavage products obtained by the hydrolytic decomposition of collagen through the influence of heat and pressure by steam.

The process as practised by me for obtaining the reinforcing agent for rubber is as follows: The collagen obtained from any source is first placed in a closed digester. Hydrolytic decomposition is effected by admitting steam to the digester. Steam admitted at 100 lbs. pressure for approximately two hours has been found to be ample in connection with the collagen obtained from young animals. With the older collagen, however, it is desirable to carry on the digesting process for a longer period of time as for example even up to six hours. The process can be hastened, however, by increasing the steam pressure or superheating the steam. The difficulty with the higher steam pressures, however, especially when collagen of a miscellaneous type is being treated in large quantities at one time, such as 15,000 to 20,000 pounds or more, is that the higher steam pressures when long continued are apt to have a too drastic action on the collagen and produce an undue proportion of the amino-acids. Accordingly it is desirable to raise the steam pressure gradually and to remove the soluble cleavage products at intervals rather than make one long digestion to prevent the first fraction of cleavage products formed, from hydrolyzing through into the amino-acid group although at times some may be present. Thus steam might first be admitted to the digester at about 60 pounds pressure for about two hours, the steam then shut off, pressure on the digester relieved and the soluble products thus far formed removed. Steam might then be admitted at 80 pounds pressure for a further period of two hours, the steam then shut off, the pressure relieved and the soluble products again removed. Steam may then well be admitted to the digester at 100 pounds pressure for a period of at least two hours depending upon the condition of the mass within the digester.

At the expiration of the hydrolyzing process the material drawn off is passed through any suitable filter, evaporated to a consistency of from preferably 50 to 75 per cent solids, and then reduced to dry form and pulverized as desired.

The collagen derivatives thus obtained constitute the reinforcing agent of my invention, which is mixed or compounded either in plastic or dry form as desired with the rubber before vulcanizing in the ordinary manner.

By the term "collagen" as used herein and in the claims is meant the tissue which forms a constituent part of the hides, bones and sinews of animals.

Having thus fully described my invention, I claim and desire to secure by Letters Patent of the United States:—

1. A rubber composition comprising rubber having compounded with it soluble and diffusible cleavage products obtained by the hydrolytic decomposition of collagen, and which cleavage products are substantially short of amino-acids.

2. A rubber composition comprising rubber having compounded with it soluble and diffusible cleavage products obtained by the hydrolytic decomposition of collagen by steam and pressure, and which cleavage products are substantially short of amino-acids.

CHARLES H. CAMPBELL.